Nov. 9, 1948.    R. H. WHITEHEAD    2,453,479
TIME FUSE
Filed Oct. 5, 1939    6 Sheets-Sheet 1

INVENTOR
RICHARD H. WHITEHEAD
BY
ATTORNEY

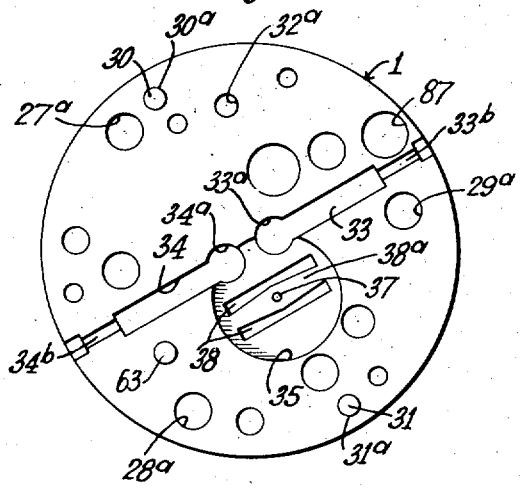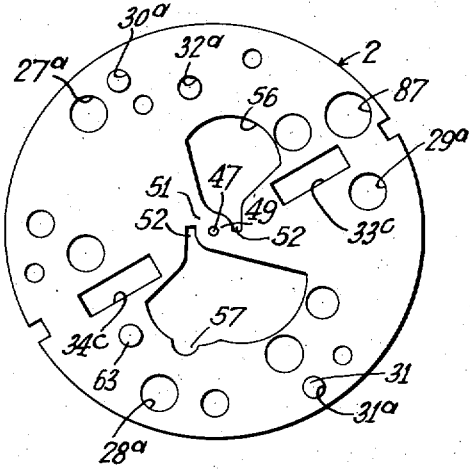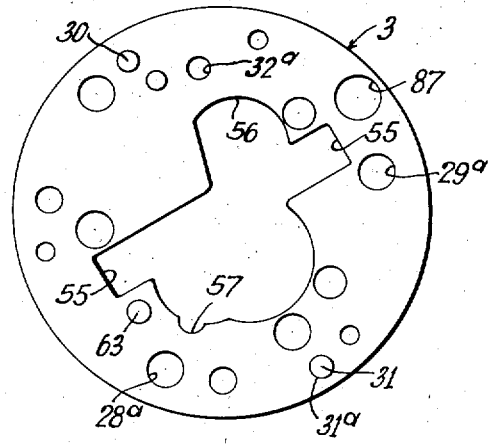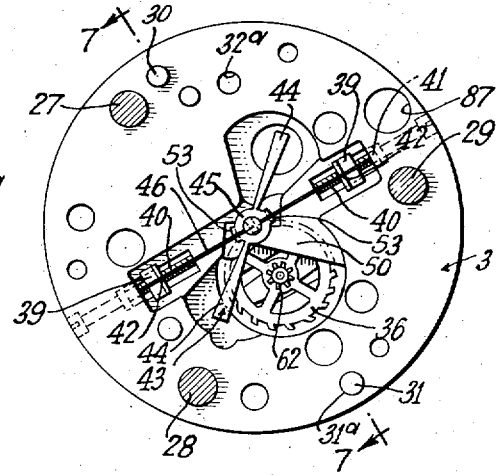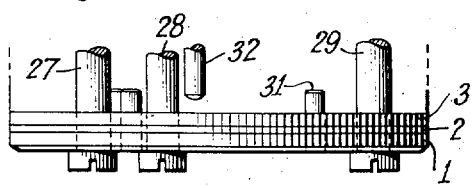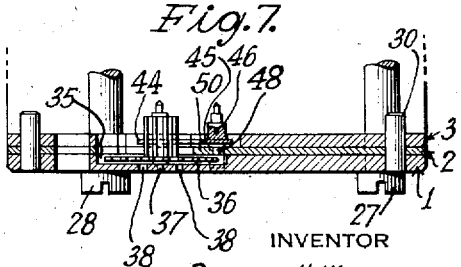

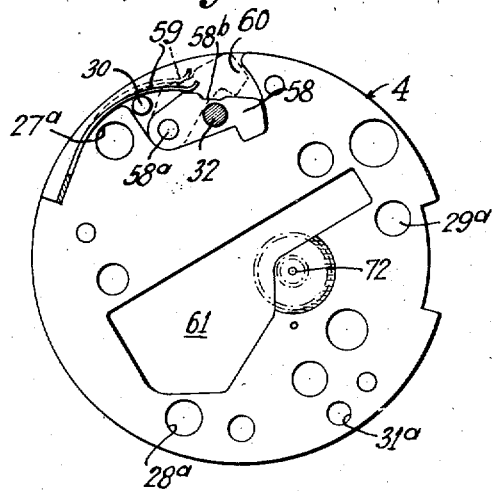
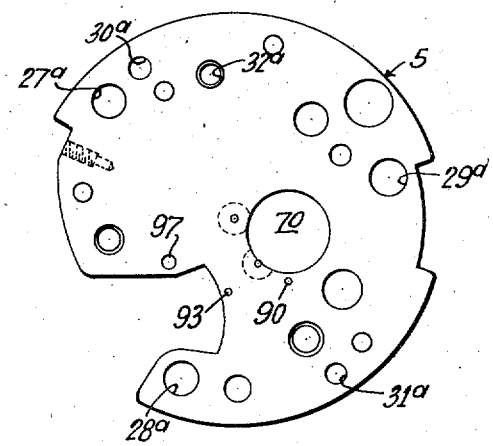
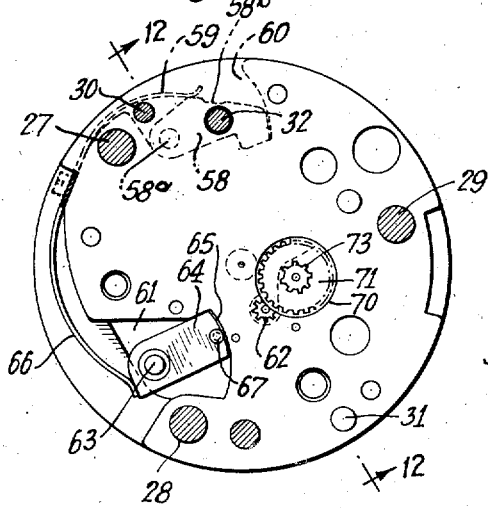
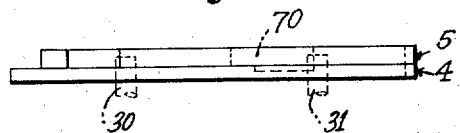
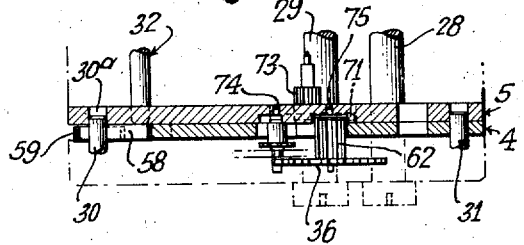

Nov. 9, 1948. R. H. WHITEHEAD 2,453,479
TIME FUSE
Filed Oct. 5, 1939 6 Sheets-Sheet 4
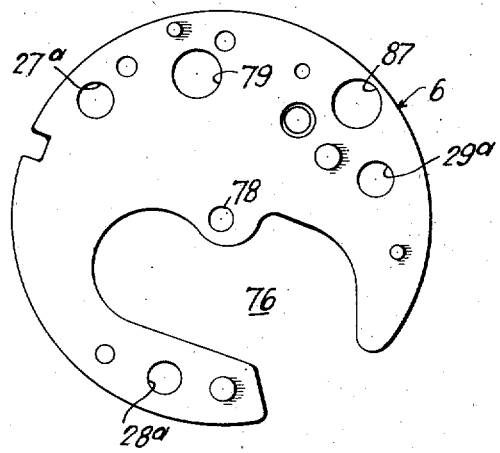
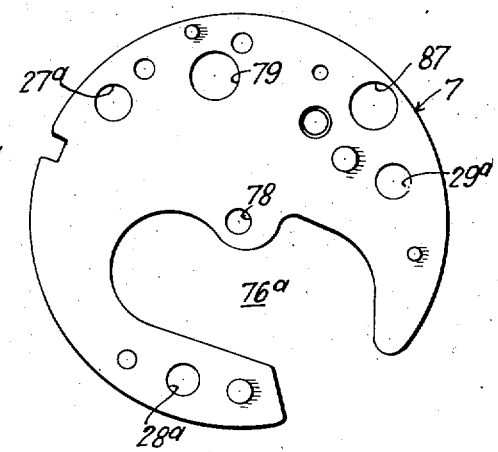
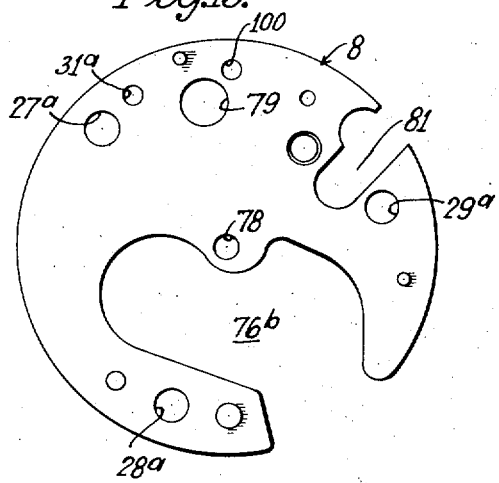
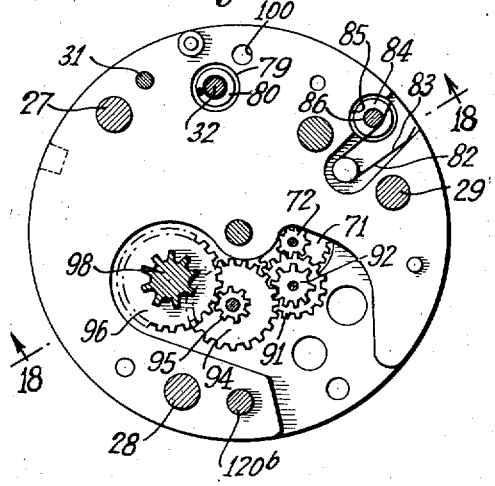
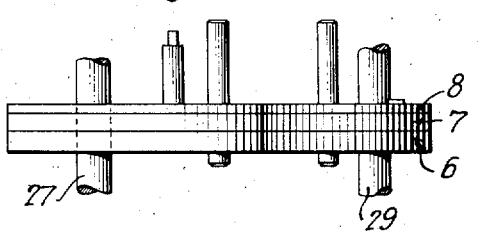
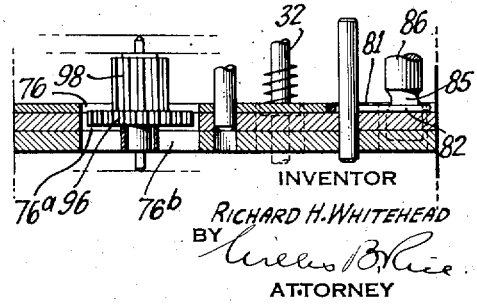
INVENTOR
RICHARD H. WHITEHEAD
BY
ATTORNEY Nov. 9, 1948. R. H. WHITEHEAD 2,453,479
TIME FUSE
Filed Oct. 5, 1939 6 Sheets-Sheet 5
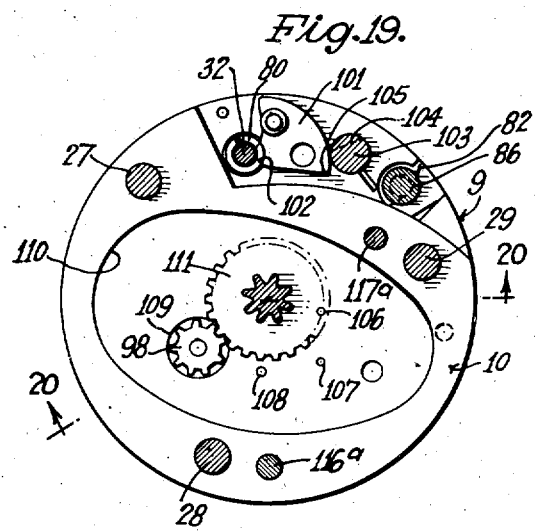
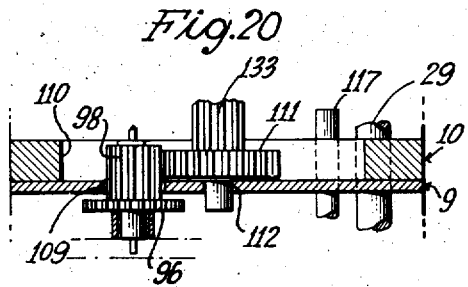
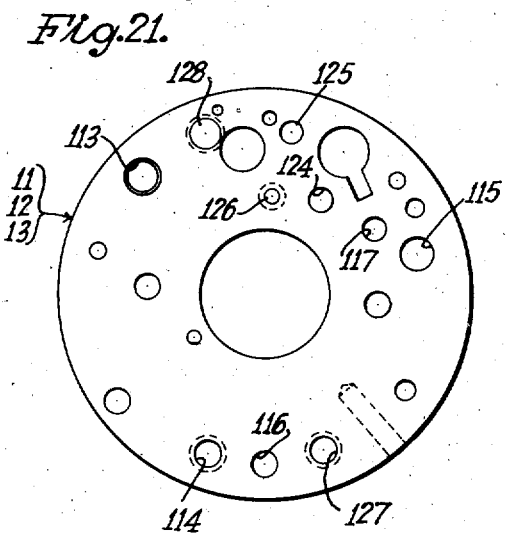
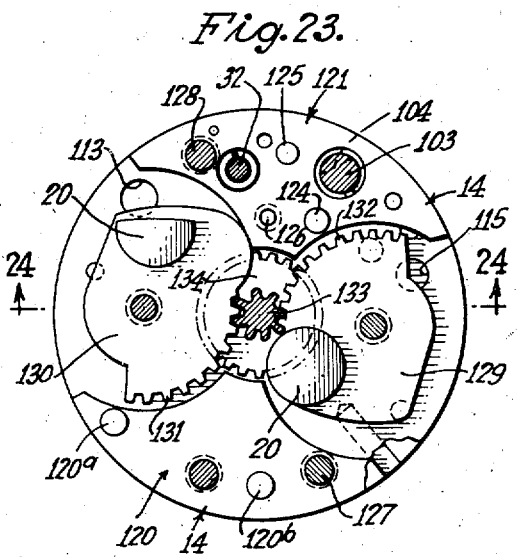
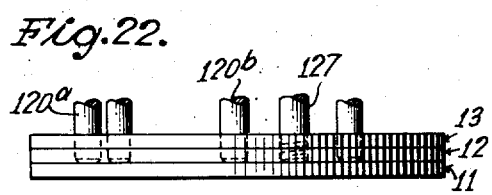
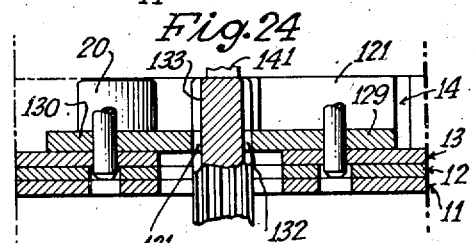
INVENTOR
RICHARD H. WHITEHEAD
BY
ATTORNEY Nov. 9, 1948.   R. H. WHITEHEAD   2,453,479
TIME FUSE Filed Oct. 5, 1939   6 Sheets-Sheet 6

INVENTOR
RICHARD H. WHITEHEAD
BY
ATTORNEY

Patented Nov. 9, 1948

2,453,479

UNITED STATES PATENT OFFICE 2,453,479

TIME FUSE

Richard H. Whitehead, New Haven, Conn., assignor, by mesne assignments, to the United States of America Application October 5, 1939, Serial No. 298,128

1 Claim. (Cl. 102—84)

This invention relates to time fuzes and more particularly to time fuzes intended to be used for artillery shells, as for example anti-aircraft shells, which embody a clock train arranged to be started at the time of discharge of the shell from the gun and to explode the shell a predetermined number of seconds thereafter.

This invention is an improvement on time fuzes already existent and many of the features herein disclosed and described are characteristic of the time fuzes on which this invention is an improvement.

It is an object of this invention to provide a time fuze which may be manufactured and assembled at less expense and which notwithstanding this fact will have greater reliability.

It is a further object to provide a method of manufacturing such a fuze which will reduce to a minimum the amount of any labor involved and thereby eliminate the inaccuracies attendant thereon.

It is a further object to provide a fuze which can be manufactured with the various pivot bearings accurately in place but may be stamped from dies with the minimum of drilling and with a minimum of machining.

The invention accordingly comprises the features of construction, combination of elements, and arrangements of parts, which will be exemplified in the construction hereinafter set forth and the scope of the application of which will be indicated in the claim.

For a fuller understanding of the nature and objects of the invention, reference should be had to the following detailed description, taken in connection with the accompanying drawing, in which:

Figures 2, 3 and 4 are respectively the bottom plate, the second and the third plates of the frame.

Figure 5 is a side elevation of plates 1, 2 and 3 in their assembled relation and showing the relation of all three plates to the firing pin when the latter is in working position.

Figure 1:
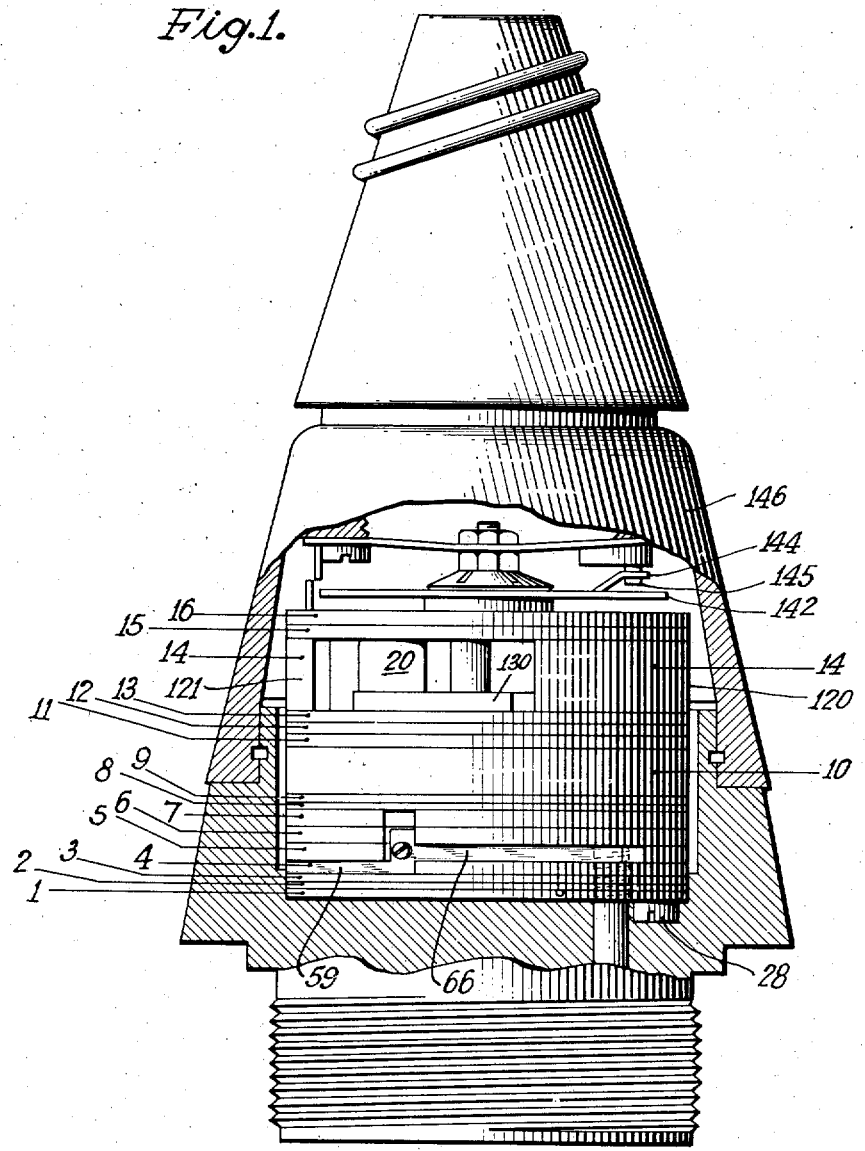
Figure 1 is a side elevation of a fuze embodying this invention with the enclosing parts broken away.

Figures 6 and 7 are a plan and section, respectively, of plates 1, 2 and 3 in their assembled relation showing the vibrator and escapement wheel in position.

Figures 8 and 9 show respectively the 4th and 5th plates of the assembled device.

Figure 10 is a side elevation of plates 4 and 5 in assembled relation.

Figure 11 is a plan of the assembly of plates 4 and 5 with the vibrator detent and some of the gears in place.

Figure 12 is a section on the lines 12—12 of Figure 11 showing the relation of the escapement and the vibrator to plates 4 and 5.

Figures 13, 14 and 15, respectively, are plan views of the 6th, 7th and 8th plates of the frame.

Figure 16 is a side elevation of these three plates in assembled relation.

Figure 17 is a plan view of the assembly of plates 6, 7 and 8 with operating gears in place.

Figure 18 is a section on the line 18—18 of Figure 17.

Figure 19 is a plan view of the assembly of plates 9 and 10 inclusive with the operating parts in place.

Figure 20 is a sectional view through plates 9 and 10 on the line 20—20 of Figure 19 showing the relation of the plates to the relevant gears.

Figure 21 is a plan of plates 11, 12 and 13 which plates in their general contour are identical but differ in details which will be later described.

Figure 22 is a side elevation of the assembly of plates 11, 12 and 13.

Figure 23 is a plan view of the assembly of plates 1 to 14 inclusive, showing the centrifugal driving mechanism.

Figure 24 is a section on the line 24—24 of Figure 23 through the assembly of plates 11 to 14 inclusive.

Figure 25:
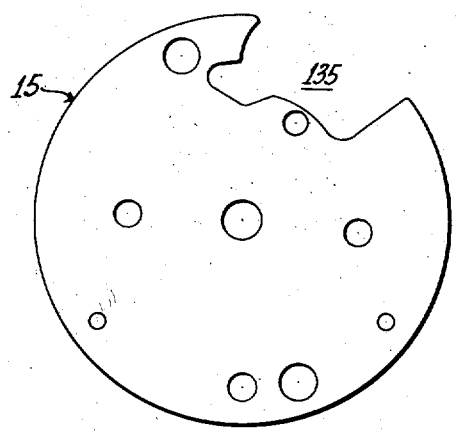

Figure 25 is a plan of plate 15.

Figure 26:
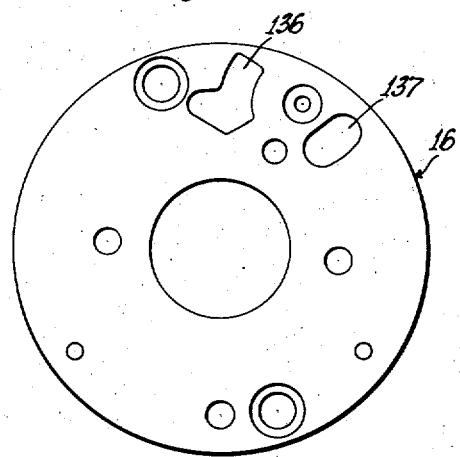

Figure 26 is a plan of plate 16.

Figure 27:
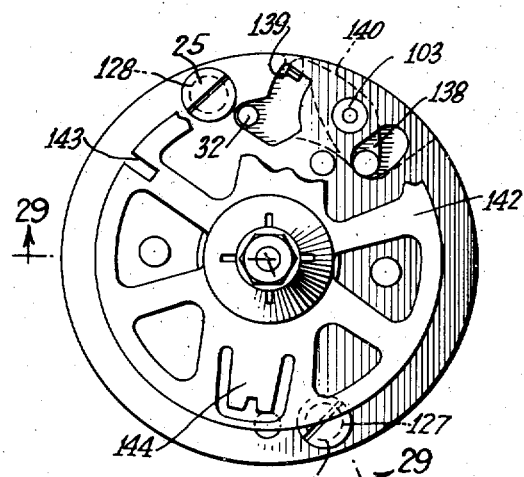

Figure 27 is a top plan view of the fuze, parts being broken away.

Figure 28:
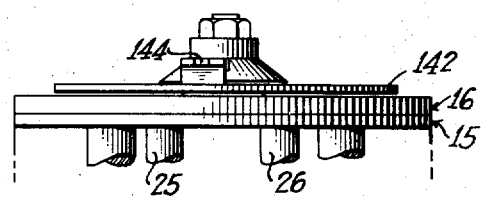

Figure 28 is a side elevation of the assembly of plates 15 and 16 and associated parts.

Figure 29:
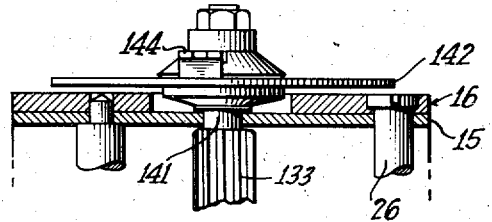

Figure 29 is a section on the line 29—29 of Figure 27.

Figure 30:
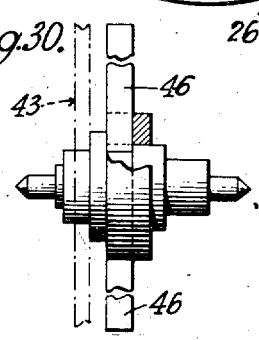
Figure 31:
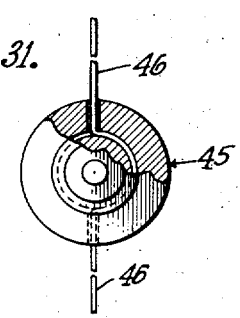

Figures 30 and 31 are a side elevation and a front elevation respectively, of the vibrator element.

The fuze of this invention comprises primarily sixteen stacked plates herein numbered 1, 2, 3, 4, 5, 6, 7, 8, 9, 10, 11, 12, 13, 14, 15, and 16 which are assembled together in superposed relation to form at once the housing for the fuze and to serve as the bearing plates therefor and within these plates are journaled the operating parts comprising primarily centrifugal driving weights 20 (see Figures 1 and 23) operating through a gear train (see Figures 17, 12 and 6) to drive the escapement wheel 36 under control of a vibrator 43.

The time train, through a mechanism which will be later described, is arranged to release a firing pin 32 to set off the shell after the time train has moved a pre-determined length of time.

The general relation of the driving weights, the time train and the firing pin form no part of this invention which consists primarily in the specific provisions of construction of the device to give it rigidity and reliability and to reduce its cost of manufacture.

It has heretofore been proposed to construct these time fuzes from a series of plates of considerable thickness and to provide recesses to receive the operating parts by milling out portions of the surface of the supporting plates. Moreover the necessary thickness of these plates with this method of construction is such that the bearings for the pivots were formed by gang drilling, a system which is not only expensive but which cannot be kept within satisfactory tolerances in quantity production.

When the plates are made in accordance with the former construction above described it has been impractical to get the bearings, particularly the bearings for the vibrator, sufficiently close to the periphery of the escapement wheel to function properly and at the same time close enough to its plane and rigid enough to give the bearing the necessary strength and support to withstand the tremendous strains imposed during the firing of the shell and during flight.

Moreover when the device is made with thick plates it results in the bearings for the various pivots being unduly long with a consequent tendency to bind if either bearing or pivot be slightly out of true and a corresponding difficulty of securing adequate lubrication.

If, on the other hand, a shorter bearing is desired than the width of the plate it becomes necessary to ream the opening to a larger diameter part way through the plate, a proceeding which is expensive and, in quantity production, unreliable and which may in itself leave a burr in the bearing in the middle of the plate. All of these defects have made the construction of such fuzes difficult and expensive and have made the fuzes, when constructed, unreliable.

It is an object of this invention so to construct the fuze as to obviate these difficulties and at the same time give to the bearings the full strength of the surface portion of the middle sheets.

It is a further object of this invention to provide a safety device which will positively prevent the firing pin from striking the percussive except under conditions of flight and which cannot strike during the ordinary handling of the shell.

To accomplish these results the fuze which has heretofore been constructed with eight supporting plates is now constructed with sixteen and by this arrangement together with the rearrangement of the internal mechanism which this makes possible the foregoing difficulties are overcome.

For practical reasons the assembled mechanism is divided into three groups—one group comprising plates 12, 13, 14, 15 and 16, being held together as a sub-assembly with their associated parts by screws 25 and 26 which extend through openings 125 and 126 in the plates and screw into plates 11, 12 and 13, whereas the remaining portions of the device comprising plates 1 to 11 are held in their assembled position by screws 27, 28 and 29 which extend through all of the plates 1 to 11 inclusive and screw into plates 12 and 13.

Referring now to Figures 2 and 7 of the drawings, the plate 1, like all the other plates, is generally circular in form and in common with plates 2 and 13 is provided with three spaced openings 27a, 28a, and 29a to receive the screws 27, 28 and 29. This plate in common with plates 2 to 5 has also openings 30a and 31a to receive dowel pins 30 and 31 which fit tightly within the openings and are used to maintain the successive plates in accurate alignment. The plate in common with plates 2 to 5 is also provided with an opening 32a, to receive the firing pin 32 as will be hereinafter described. In common with plates 2 to 8 inclusive it is provided with openings 227, 228 and 229 to receive retaining screws not shown, which screw into plates 6, 7 and 8 and hold the fuze in its housing.

Extending diametrically outwardly from the center of the plate is a pair of slots 33, 34 receiving and permitting the adjustment of blocks 39 for varying the effective length of the hair spring as will be hereinafter described and these slots are preferably somewhat enlarged at their inner ends as shown at 33a and 34a to receive the verge pins, and bearing grooves are cut in the face of the plate, as shown at 33b and 34b terminating at each end in a shoulder to receive the neck of the small adjusting screw, as will be hereinafter described.

A recess 35 is provided in the plate to receive an escapement wheel 36 which is pivoted in the bottom of the recess as shown at 37 in position to have the teeth of the escapement wheel cooperate with the verge pins, as will be hereinafter described. Preferably slots 38 are cut parallel to each other on each side of the pivot bearing 37 to give a certain possibility of adjustment to the bearing relative to the verge pins.

I prefer to make the plate 1 thick enough to receive the escapement wheel in the recess 35 rather than to assemble two plates together since the machining of the recess is a relatively simple matter and this affords a rigidity to the outer plate which is desirable.

It is characteristic of the rolled stock from which these plates are made that the fabricating operation produces a surface which is materially harder than the interior. This fact is taken advantage of in this invention and the important end bearings are carried on the hardened surface rather than upon the softer interior portion, such as is exposed by recessing or under-cutting. Should it be desired to produce a hardened surface also for the escapement wheel, this may be accomplished by special pressing of the bridge 38a between the slots 38 at the point adjacent to the bearing 37. So far, however, this has not been found necessary.

The second plate is provided with slots 33c and 34c in alignment with the slots 33 and 34 but of slightly different shape to carry movable blocks 39 slidable longitudinally in the slots under the influence of screws 40. The heads of these screws have a cut down portion forming a journal turnable within grooves 33b and 34b and engaging shoulders to prevent longitudinal movement of the screws. These screws are threaded into blocks 39 whereby on turning of the screws the blocks 39 may be moved toward and from the center of the plate. Each of these blocks 39 is provided with a fine slot 42 to receive and constrain the ends of the hair spring 46 of the vibrator as will be described, to regulate the timing of the latter.

The vibrator 43, which may conveniently be made in the form of arms 44 extending outwardly from a central hub 45 which also carries a hair spring 46 which is in the form of a straight piece of wire having its central portion held upon the hub and its ends extending outwardly to engage the slots 42.

Plate #2 is provided at its center with a pivot bearing 47 for the lower pivot 48 of the vibrator and this pivot bearing is carried on a bridge 49 formed by extending the portion of the plate, as shown at 50, over the edge of the escapement wheel 36 to furnish a support for one end of the bridge 49, the other end of the bridge being supported direct from the plate as shown at 51. These parts are so designed and arranged as to provide for openings 52 through the plate number 2 in position to permit verge pins 53 extending downwardly from the hub 45 to extend through the plate number 2 and across the path of the teeth of the escapement wheel 36 to cooperate with the latter in the usual manner.

With this construction it will be clear that the periodicity of the vibrator may be regulated by movement of the screws 40 so that the timing of the fuse may be regulated. It will also be clear that by reason of the fact that the plate 2 extends across between the vibrator and the escapement wheel to carry the pivot of the former and yet permit pins of very short length to extend into the path of the escapement wheel, a maximum of rigidity and durability is combined with a maximum of simplicity of fabrication.

Plate number 3 has the openings for the screws, dowel pins and firing pin such as have already been described for the other plates and it has a diametrical slot 55 extending clear across its center to provide a clearance for the screws 40 and for the hub of the vibrator and hair spring.

This plate and plate #2 are, moreover, cut out as shown at 56 to provide suitable clearance for one end of the vibrator and at 57 to provide suitable clearance for the other end of the vibrator and for a vibrator dog which will be described.

Superposed on plate 3 and pivoted on a pin 58a is a dog 58 of such size and shape that in one position as shown in Figure 8 it will lie in the direct path of the firing pin and that it may be moved by centrifugal force to a point out of said path. A spring 59 is arranged to bear upon the dog 58 to hold it in position to obstruct the firing pin until forced outwardly by the centrifugal force. The plate 4 is cut out as shown at 60 to accommodate the dog 58 and spring 59.

This dog 58 may be provided with a notch 58b into which the spring 59 may pass, as shown, to hold the dog in its outward position once it has been thrown out by the rotation of the shell.

Plate number 4 is cut out as shown at 61 to provide further clearance for the blocks 39 and for the hub 45 of the vibrator and for a pinion 62 on the escapement wheel.

Pin 63 extends upwardly from the plate #3 within the recess 61 and on this pin is pivoted a dog 64 having a shoulder 65 of sufficient height to move the body of the dog above the level of plate number 4.

This dog is movable outwardly upon its pin under the influence of centrifugal action and is held inwardly by a spring 66. Springs 66 and 59 may be of one piece as will be seen from Figure 1 and are preferably of non-spring material. This dog carries a pin 67 so placed that in the inward position of the dog the pin will lie in the path of the vibrator to prevent its movement but will be moved out of the path of the vibrator to permit this vibration when the dog is moved under the influence of centrifugal force. With this construction the vibrator cannot function to release the time train except while the fuse is rapidly rotating.

Plate #5 is cut out at 70 to provide room for a gear 71 which is pivoted at 72 in plate 4 in position to mesh with the pinion 62 upon the escapement wheel and this gear 71 in turn has connected to it a pinion 73. The plate 5 furnishes an upper bearing 74 for the vibrator and an upper bearing 75 for the escapement wheel shaft and the plate may be recessed upon its under face to permit each of these bearings to be of less length than the thickness of the plate.

Plates 6, 7 and 8 are spacer plates cut out as shown at 76 and 76a and 76b to provide space for the gears and having a central bearing 78 serving as a lower bearing for the main drive shaft hereinafter to be described. These plates are provided with the openings 27a, 28a and 29a but not with the openings 30a and 31a since the pins 30 and 31 are of a length equal to the thickness of the first five plates only. Moreover, these plates 6, 7 and 8 are provided with an opening 79 in alignment with the opening 32a but materially larger than said opening, to accommodate a shoulder 80 upon the firing pin limiting the outward movement of the firing pin at the point where the shoulder strikes the plate 5, and to receive the thrust of the coil main spring.

Plate 8 is provided with a cut-out 81 to accommodate a U-shaped spring 82 having one end bearing against the side of the cut out as shown at 83 and the other side bearing against a dog 84. The dog is preferably cylindrical in form having a circumferential groove 85 around the body thereof and a guide pin 86 extending outwardly from the end thereof along the axis and this guide pin works in an opening 87 cut through all of plates 1 to 8 of a diameter freely to pass the body of the dog. This dog is so disposed as to be movable along its axis and the spring 82 engaging the side of the dog creates friction in this axial movement, particularly by reason of the fact that in the normal position of the fuse when not being fired the spring rests within the circumferential groove and thus offers material resistance to the axial movement. As soon, however, as the projectile is fired from the gun, the initial force of starting the projectile upon its pathway throws the dog backwardly, notwithstanding the action of the spring. This dog is so positioned as will be hereafter described that in its forward position it will prevent the operation of the fuse but as soon as it is subjected to the force of starting the projectile the pin is jerked backwardly out of the way of the operating mechanism.

Within the plate 5 is pivoted at 90 a gear 91 in position to mesh with the pinion 72 on the gear 71 and in turn carrying a pinion 92. Also journaled in the plate 5 at 93 is a gear 94 in position to mesh with the pinion 92 and in turn carrying a pinion 95. A gear 96 is pivoted at 97 in position to mesh with the pinion 95 and itself carries a pinion 98.

The gears 91, 94 and 96 are all situated within the space 76 of the plates 6, 7 and 8, but the pinion 98 extends materially above plate 8 for a purpose to be described.

Upon plate 8 there is pivoted at 100 a dog 101 adapted to swing outwardly about its own pivot under the influence of centrifugal force and having a tit 102 which in the inner position of the dog will lie in the path of the shoulder 80 and in its outer position will be free from said shoulder, this dog being constructed and arranged to have the tit 102 lying beneath the shoulder 80 when the firing pin is in the cocked or unfired position. Also pivoted in the plate 8 is a shaft 103 having a squared side 104, the shaft being so situated that it obstructs the movement of the end 105 of the dog 101 except when the squared side 104 is opposite the dog at which time it is released for movement. This shaft 103 is controlled by the time train as will be hereinafter described so that it can release the dog 101 only after the lapse of the predetermined length of time.

Plate 9 carries the upper pivot bearings 106, 107 and 108 of the gear 71, 91 and 94 and is cut out as shown at 109 to accommodate the pinion 98.

Plate 10 comprises a spacer of the same periphery as plate 9 but cut out as shown at 110 to provide space for the pinion 98 and for the central drive gear 111 which is carried by the upper part of the mechanism. This gear 111 being pivoted in an opening 112 in plate 9 in position to mesh with the pinion 98.

Plates 11, 12 and 13 are of similar contour as shown in Figure 21 and they are provided with threaded openings 113, 114 and 115 to receive the threaded ends of the screws 27, 28 and 29 for holding the parts together and with openings 116 and 117 registering with corresponding openings in each one of the other plates 4 to 10 inclusive to receive dowel pins 116a and 117a to hold the plates in alignment with each other.

Above the plate 13 is what has heretofore been referred to as plate 14 but which in fact comprises two substantially triangular blocks 120 and 121. Block 120 being provided with two dowel pins 120a and 120b. Plate 121 is held in place by two dowel pins 124 and 125 and by a screw 126. Plates 15 and 16 are supported upon the blocks 120 and 121 and held to said blocks by screws 127 and 128.

Pivoted at one end in the plate 13 and at the other end in plate 15 are a pair of eccentric members 129 and 130 carrying weights 20 and having in their periphery gear teeth 131 and 132 adapted to mesh with a pinion 133 which is also pivoted in the same plates and which carries a gear 134 which is positioned to extend downwardly below plates 11, 12 and 13 in order to mesh with pinion 98. Plate 15 is cut out as shown at 135 and plate 16 is cut out as shown at 136 and 137 to receive the ends 138 and 139 of an arm 140 carried by the shaft 103. The end 138 of this arm is materially heavier than the end 139 so that as the fuze is revolving in flight the centrifugal force will tend to turn the shaft 103 about its axis.

The shaft 141 of the pinion 133 extends outwardly beyond the plate 16 and carries a disc 142 having a single slot in its periphery as shown at 143. This disc also carries preferably at a point opposite to the slot 143 a struck up fork 144 in position to engage a pin 145 upon the setting head 146 so that by rotating the outer head 146, the disc 142 may be rotated. Thereafter while the clock mechanism is being operated by the centrifugal weights 129 and 130, the disc 142 will be rotated by the timing mechanism.

With the construction above described it will be clear that every bearing in the fuze is rigidly supported, that the device has been reduced to a form in which accurate punchings can be substituted for machined parts producing greater accuracy and at the same time reducing cost. Moreover by reason of the fact that rolled sheets are harder at their surface than at their interior, the bearings for the device are important because a greater number of bearings can utilize the harder surface instead of requiring that the thrust be taken upon interior parts of the metal.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language might be said to fall therebetween.

Having described my invention, what I claim as new and desire to secure by Letters Patent, is:

A time fuze comprising a detonating device, a timing mechanism, a means for connecting the timing mechanism to the detonating device for releasing the latter, said timing device comprising a plate having a lateral recess, an escapement wheel pivoted within said recess in said plate, a second plate parallel to said first mentioned plate and above said wheel, said second plate being relatively thin and having a pair of openings therethrough in alignment with the periphery of said wheel and defining between them a bridge connected to said plate at both ends and overlying the periphery of said wheel, an oscillating element pivoted in said bridge and having relatively short pins extending through said openings in said thin second plate into the plane of said wheel in position to cooperate therewith, said first mentioned plate having substantially parallel slots therethrough closely spaced to provide a narrow bridge portion between them having the pivot for the escapement wheel, said slots and second mentioned bridge providing for adjustment of the pivot bearing relative to said pins of the oscillating element.

RICHARD H. WHITEHEAD.

REFERENCES CITED

The following references are of record in the file of this patent:

UNITED STATES PATENTS

| Number | Name | Date |
|---|---|---|
| Re. 16,596 | Colomb | Apr. 19, 1927 |
| 293,018 | Hart | Feb. 5, 1884 |
| 1,777,547 | Bold | Oct. 7, 1930 |
| 1,927,746 | Junghans | Sept. 19, 1933 |

FOREIGN PATENTS

| Number | Country | Date |
|---|---|---|
| 284,186 | Great Britain | Jan. 26, 1928 |
| 565,111 | France | Nov. 3, 1923 |
| 821,058 | France | Aug. 17, 1937 |